United States Patent
Ohno et al.

(10) Patent No.: US 8,110,139 B2
(45) Date of Patent: Feb. 7, 2012

(54) METHOD FOR MANUFACTURING HONEYCOMB STRUCTURE

(75) Inventors: Kazushige Ohno, Ibi-gun (JP); Masafumi Kunieda, Ibi-gun (JP); Masatoshi Okuda, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 107 days.

(21) Appl. No.: 12/044,858

(22) Filed: Mar. 7, 2008

(65) Prior Publication Data

US 2008/0237941 A1 Oct. 2, 2008

(30) Foreign Application Priority Data

Mar. 30, 2007 (WO) .................. PCT/JP2007/057305

(51) Int. Cl.
| | |
|---|---|
| B28B 1/00 | (2006.01) |
| B28B 3/00 | (2006.01) |
| B28B 5/00 | (2006.01) |
| C04B 33/32 | (2006.01) |
| C04B 33/36 | (2006.01) |
| C04B 35/64 | (2006.01) |
| B29C 47/00 | (2006.01) |
| B29C 47/12 | (2006.01) |

(52) U.S. Cl. .................. 264/630; 264/177.12; 264/629; 264/631

(58) Field of Classification Search .................. 264/630, 264/631, 177.12, 629; 156/60, 63, 65, 69, 156/71, 89.11–89.28, 145, 160–181, 228, 156/240–249, 290–330
See application file for complete search history.

(56) References Cited

U.S. PATENT DOCUMENTS

| | | |
|---|---|---|
| 5,914,187 A | 6/1999 | Naruse et al. |
| 6,669,751 B1 | 12/2003 | Ohno et al. |
| 7,112,233 B2 | 9/2006 | Ohno et al. |
| 7,309,370 B2 | 12/2007 | Kudo et al. |
| 2004/0161596 A1 | 8/2004 | Taoka et al. |
| 2005/0109023 A1 | 5/2005 | Kudo et al. |
| 2005/0153099 A1 | 7/2005 | Yamada |
| 2005/0160710 A1 | 7/2005 | Taoka et al. |
| 2005/0161849 A1 | 7/2005 | Ohno et al. |
| 2005/0169819 A1 | 8/2005 | Shibata |

(Continued)

FOREIGN PATENT DOCUMENTS

EP 1623750 2/2006

(Continued)

*Primary Examiner* — Khanh P Nguyen
*Assistant Examiner* — Matthew Hoover
(74) *Attorney, Agent, or Firm* — Ditthavong Mori & Steiner, P.C.

(57) ABSTRACT

A honeycomb structure is manufactured by molding a pillar-shaped honeycomb molded body having a large number of cells disposed in parallel with one another in a longitudinal direction with a cell wall therebetween by extrusion-molding a raw material composition including a ceramic powder and a binder, and carrying out a firing treatment on the honeycomb molded body to manufacture a honeycomb fired body. A plurality of the honeycomb fired bodies are provided, and both end faces of each of the plurality of the honeycomb fired bodies are hold with a holding member after positioning the plurality of the honeycomb fired bodies on a predetermined position. An adhesive paste is injected into a gap between the plurality of honeycomb fired bodies held on the predetermined position. The adhesive paste is dried and solidified to form an adhesive layer.

5 Claims, 9 Drawing Sheets

U.S. PATENT DOCUMENTS

| | | |
|---|---|---|
| 2005/0175514 A1 | 8/2005 | Ohno |
| 2005/0178098 A1 * | 8/2005 | Ono et al. .................. 55/523 |
| 2005/0180898 A1 | 8/2005 | Yamada |
| 2005/0229565 A1 | 10/2005 | Yoshida |
| 2005/0247038 A1 | 11/2005 | Takahashi |
| 2005/0272602 A1 | 12/2005 | Ninomiya |
| 2006/0021310 A1 | 2/2006 | Ohno et al. |
| 2006/0051556 A1 | 3/2006 | Ohno et al. |
| 2006/0166820 A1 | 7/2006 | Ogyu et al. |
| 2006/0210765 A1 | 9/2006 | Ohno et al. |
| 2006/0213163 A1 | 9/2006 | Taoka et al. |
| 2006/0216466 A1 | 9/2006 | Yoshida |
| 2006/0216467 A1 | 9/2006 | Yoshida |
| 2006/0222812 A1 | 10/2006 | Koyama et al. |
| 2006/0225390 A1 | 10/2006 | Yoshida |
| 2006/0228521 A1 | 10/2006 | Ohno et al. |
| 2006/0230732 A1 | 10/2006 | Kunieda |
| 2006/0254231 A1 | 11/2006 | Hayashi et al. |
| 2007/0020155 A1 | 1/2007 | Ohno et al. |
| 2007/0028575 A1 | 2/2007 | Ohno et al. |
| 2007/0044444 A1 | 3/2007 | Oshimi |
| 2007/0065348 A1 | 3/2007 | Ohno et al. |
| 2007/0068128 A1 | 3/2007 | Oshimi et al. |
| 2007/0116908 A1 | 5/2007 | Ohno et al. |
| 2007/0126160 A1 | 6/2007 | Takahashi |
| 2007/0128405 A1 | 6/2007 | Sakaguchi et al. |
| 2007/0130897 A1 | 6/2007 | Sakaguchi et al. |
| 2007/0169453 A1 | 7/2007 | Hayakawa |
| 2007/0178275 A1 | 8/2007 | Takahashi |
| 2007/0190289 A1 | 8/2007 | Fujita |
| 2007/0190350 A1 | 8/2007 | Ohno et al. |
| 2007/0196620 A1 | 8/2007 | Ohno et al. |
| 2007/0204580 A1 | 9/2007 | Kunieda |
| 2007/0212517 A1 | 9/2007 | Ohno et al. |
| 2007/0293392 A1 | 12/2007 | Ohno et al. |
| 2008/0202086 A1 | 8/2008 | Ohno et al. |
| 2008/0202087 A1 | 8/2008 | Ohno et al. |
| 2008/0203626 A1 | 8/2008 | Ohno et al. |
| 2008/0236394 A1 | 10/2008 | Ohno et al. |
| 2008/0237941 A1 | 10/2008 | Ohno et al. |
| 2008/0241501 A1 | 10/2008 | Ohno et al. |
| 2008/0286523 A1 | 11/2008 | Ohno et al. |

FOREIGN PATENT DOCUMENTS

| | | |
|---|---|---|
| EP | 1698604 | 9/2006 |
| EP | 1780187 | 5/2007 |
| EP | 1780187 A1 * | 5/2007 |
| EP | 1849513 | 10/2007 |
| JP | 05213681 A * | 8/1993 |
| JP | 10-232335 | 9/1998 |
| JP | 2001-030153 | 2/2001 |
| JP | 2002-102627 | 4/2002 |
| JP | 2004-154718 | 6/2004 |
| JP | 2004154718 A * | 6/2004 |
| WO | WO 2005/047210 | 5/2005 |
| WO | WO 2005/099865 | 10/2005 |
| WO | WO 2006/117899 | 11/2006 |
| WO | WO 2006117899 A1 * | 11/2006 |

* cited by examiner

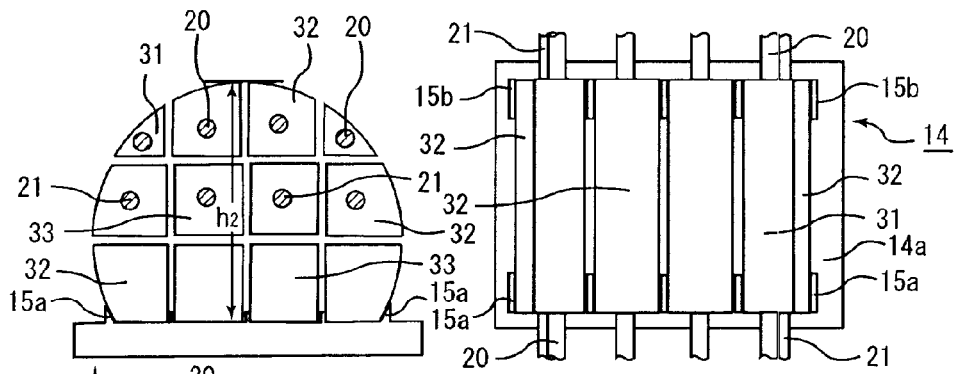
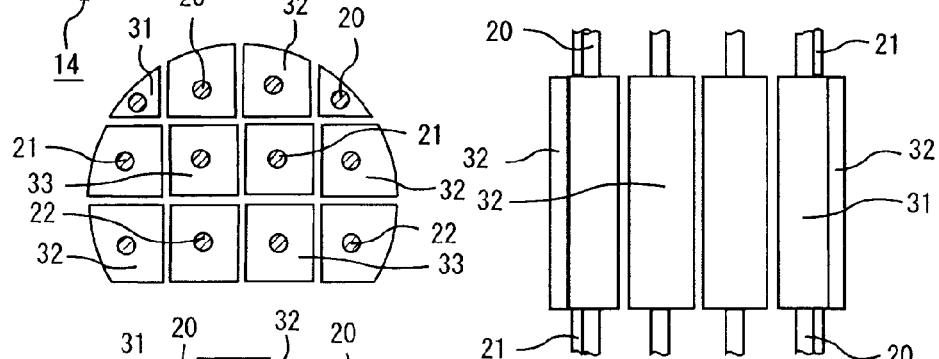
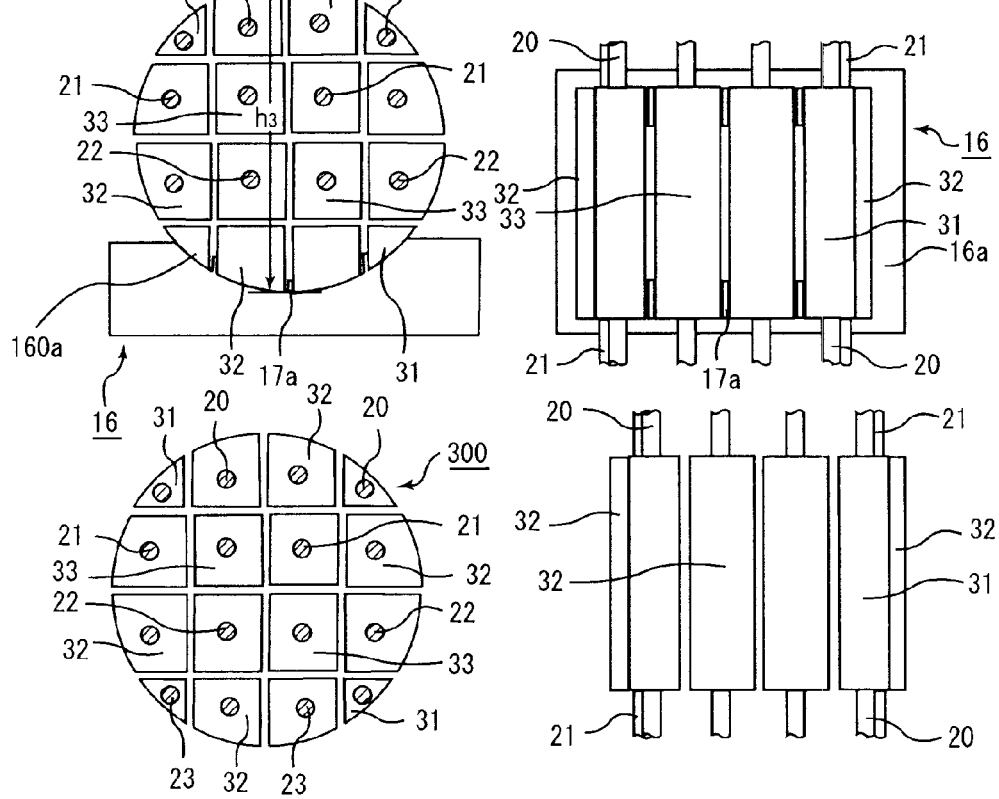

A-A line cross-sectional view

METHOD FOR MANUFACTURING HONEYCOMB STRUCTURE

CROSS-REFERENCE TO RELATED APPLICATIONS

The present application claims priority under 35 U.S.C. §119 to PCT Application No. PCT/JP2007/057305, filed Mar. 30, 2007, the contents of which are incorporated herein by reference in their entirety.

BACKGROUND OF THE INVENTION

1. Field of the Invention

The present invention relates to a method for manufacturing a honeycomb structure.

2. Discussion of the Background

Aggregated honeycomb structure formed by bonding a plurality of honeycomb fired bodies together having a large number of cells disposed in a longitudinal direction has been known as a exhaust-gas purifying filter or a catalyst supporting carrier. In such an aggregated honeycomb structure, an adhesive layer is formed on a side face of each of the honeycomb fired bodies, and the honeycomb fired bodies are bonded together by interposing the adhesive layer.

As a method for manufacturing a round pillar-shaped honeycomb structure among such honeycomb structures, a method for manufacturing a honeycomb structure by bonding three kinds of honeycomb fired bodies each having a different shape together by interposing an adhesive layer is disclosed in JP2004-154718A.

Upon bonding honeycomb fired bodies together, the honeycomb fired bodies have been bonded one by one by applying adhesive paste to a side face of a honeycomb fired body, and putting another honeycomb fired body on the adhesive-paste applied face in such a manner that the adhesive-paste applied face and a side face of another honeycomb fired body are made to be superposed.

In this case, a dimensional accuracy of the honeycomb structure to be manufactured may be deteriorated by a variation in the thickness of the adhesive paste to be applied. To solve such a problem, a method in which a spacer is inserted into an adhesive layer has been disclosed in JP2002-102627A.

The contents of JP2004-154718A and JP2002-102627A are incorporated herein by reference in their entirety.

SUMMARY OF THE INVENTION

According to one aspect of the present invention, a honeycomb structure is manufactured by molding a pillar-shaped honeycomb molded body having a large number of cells disposed in parallel with one another in a longitudinal direction with a cell wall therebetween by extrusion-molding a raw material composition including a ceramic powder and a binder, and carrying out a firing treatment on the honeycomb molded body to manufacture a honeycomb fired body. In this method, a plurality of the honeycomb fired bodies are provided, and both end faces of each of the plurality of the honeycomb fired bodies are held with a holding member after positioning the plurality of the honeycomb fired bodies on a predetermined position. An adhesive paste is injected into a gap between the plurality of the honeycomb fired bodies held on the predetermined position. The adhesive paste is dried and solidified to form an adhesive layer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 3A to 3D are vertical cross-sectional views and plan views schematically showing a holding and an injecting in a manufacturing of a honeycomb structure according to a first embodiment;

DESCRIPTION OF THE EMBODIMENTS

Figure 1A:
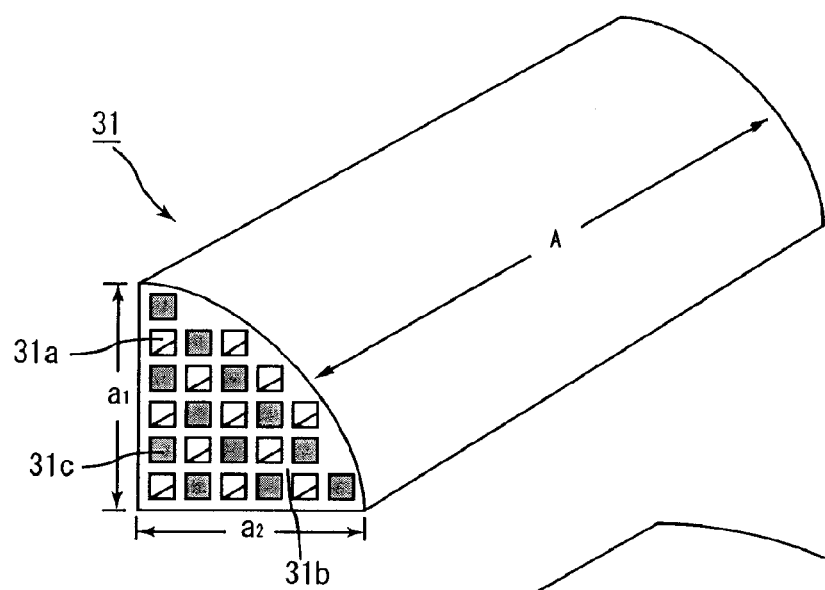
FIGS. 1A to 1C are perspective views schematically showing honeycomb fired bodies used upon manufacturing a honeycomb structure by bonding various kinds of honeycomb fired bodies.

The embodiments will now be described with reference to the accompanying drawings, wherein like reference numerals designate corresponding or identical elements throughout the various drawings.

A method for manufacturing a honeycomb structure of an embodiment of the present invention includes manufacturing a pillar-shaped honeycomb molded body having a large number of cells disposed in parallel with one another in a longitudinal direction with a cell wall therebetween by extrusion-molding a raw material composition including a ceramic powder and a binder; carrying out a firing treatment on the honeycomb molded body to manufacture a honeycomb fired body; holding both end faces of each of the honeycomb fired bodies with a holding member after positioning a plurality of the honeycomb fired bodies on a predetermined position; injecting an adhesive paste into a gap between the plurality of honeycomb fired bodies held on the predetermined position; and drying and solidifying the adhesive paste to form an adhesive layer.

According to the method for manufacturing a honeycomb structure of the embodiment of the present invention, in the holding, honeycomb fired bodies are positioned on a predetermined position and both end faces of each of the honeycomb fired bodies are held with the holding member, and in the injecting, the adhesive paste is injected into the gap between the positioned honeycomb fired bodies, so that a thickness of the adhesive paste is almost the same size of the width of the above-mentioned gap. Therefore, it may become easier to manufacture a honeycomb structure with a high dimensional accuracy. Moreover, since the honeycomb fired bodies are positioned on the predetermined position before injecting, even in the case where a position of a single honeycomb fired body is displaced, positions of the other honeycomb fired bodies are not influenced by the displacement. Therefore, it may become easier to manufacture a honeycomb structure with the whole dimensional accuracy high.

In the method for manufacturing a honeycomb structure of an embodiment of the present invention, the holding of the honeycomb fired body is carried out in such a manner that the holding member is made in contact with an end face of a single piece of the honeycomb fired body to be capable of holding the honeycomb fired body.

In the method for manufacturing a honeycomb structure of an embodiment of the present invention, the holding of the honeycomb fired body is carried out in such a manner that the holding member is made in contact with each of the end faces of the plurality of honeycomb fired bodies to be capable of collectively holding the plurality of honeycomb fired bodies.

In the method for manufacturing a honeycomb structure of an embodiment of the present invention, the holding includes previously placing the plurality of honeycomb fired bodies on each mounting face of a plurality of mounting members each having the mounting face so that the honeycomb fired bodies are placed in parallel with one another in the longitudinal direction; holding both end faces of each of the honeycomb fired bodies with the holding member after positioning each of the honeycomb fired bodies on the mounting face of a single mounting member on the predetermined position, and subsequently moving the single mounting member to an other place; holding both end faces of each of the honeycomb fired bodies with a holding member after positioning each of the honeycomb fired bodies on a mounting face of an other mounting member on the predetermined position directly under the held honeycomb fired body; and thereafter, repeatedly moving the mounting member after holding the honeycomb fired body to an other place and repeatedly holding the honeycomb fired body on a mounting face of an other mounting member, to position and hold a required number of the honeycomb fired bodies on the predetermined position.

According to the method for manufacturing a honeycomb structure of the embodiment of the present invention, the position of each of the honeycomb fired bodies placed on the same mounting face tends to be aligned along the mounting face by placing the plurality of honeycomb fired bodies on the mounting face, so that it may become easier to manufacture a honeycomb structure with a higher dimensional accuracy.

In the method for manufacturing a honeycomb structure of an embodiment of the present invention, in the holding, four pieces of the honeycomb fired bodies are placed on each of the mounting faces of first to fourth of the mounting members.

In the method for manufacturing a honeycomb structure of an embodiment of the present invention, in the holding, each of the mounting faces of the first to third mounting members is a plane face, and a plane face among side faces of the honeycomb fired body is placed on each of the mounting faces of the first to third mounting members, and the mounting face of the fourth mounting member is a curved face, and a curved face among the side faces of the honeycomb fired body is placed on the mounting face of the fourth mounting member.

In the method for manufacturing a honeycomb structure of an embodiment of the present invention, a protruding portion for positioning is disposed on the mounting face.

According to the method for manufacturing a honeycomb structure of the embodiment of the present invention, a displacement range of the position of each of the honeycomb fired bodies placed on the mounting face is limited within a width of the distance between the protruding portions, so that it may become easier to improve a positioning accuracy of the honeycomb fired bodies placed on the mounting face and to manufacture a honeycomb structure with an exceedingly high dimensional accuracy.

In the method for manufacturing a honeycomb structure of an embodiment of the present invention, a groove portion for positioning is formed on the mounting face.

According to the method for manufacturing a honeycomb structure of the embodiment of the present invention, a displacement range of the position of each of the honeycomb fired bodies placed on the mounting face is limited within a width of the distance between the groove portions, so that it may become easier to improve a positioning accuracy of the honeycomb fired bodies placed on the mounting face and to manufacture a honeycomb structure with an exceedingly high dimensional accuracy.

In the method for manufacturing a honeycomb structure of an embodiment of the present invention, a round pillar-shaped honeycomb structure including a plurality of kinds of the honeycomb fired bodies is manufactured.

In JP2002-102627A, in the case where a viscosity of the adhesive paste is high, an improvement effect of the above-mentioned method is low, and there is a limitation in an improvement of the dimensional accuracy by using the spacer.

Moreover, in the conventional bonding method, in the case where the position of a single honeycomb fired body is displaced, since a position of a honeycomb fired body put on the displaced honeycomb fired body is also displaced from an original position there is a problem that the dimensional accuracy of the whole shape formed by bonding the honeycomb fired bodies together is deteriorated.

Also, in the case where a honeycomb structure is manufactured by bonding the honeycomb fired bodies each having a different shape together as disclosed in JP2004-154718A, a low dimensional accuracy of the shape formed by bonding the honeycomb fired bodies together causes a low dimensional accuracy of the honeycomb structure to be manufactured; therefore it becomes difficult to install the honeycomb structure with the low dimensional accuracy into a casing as an exhaust-gas purifying filter.

First Embodiment

Hereinafter, the following description will discuss a first embodiment which is one embodiment of the present invention, referring to the drawings.

In the embodiment of the present invention, first, a raw material composition including a ceramic powder and a binder is extrusion-molded to manufacture a pillar-shaped honeycomb molded body having a large number of cells disposed in parallel with one another in a longitudinal direction with a cell wall therebetween, and next, a firing treatment is carried out on the above-mentioned honeycomb molded body to manufacture a honeycomb fired body.

A shape of the honeycomb fired body is not particularly limited, and the shape may be a square pillar-shape, and the like. In the present embodiment, the following description will discuss the case where a round pillar-shaped honeycomb structure is manufactured without carrying out post processings such as cutting of a periphery, by manufacturing the honeycomb fired bodies each having a plurality of kinds of shapes and bonding them together.

Figure 1B:
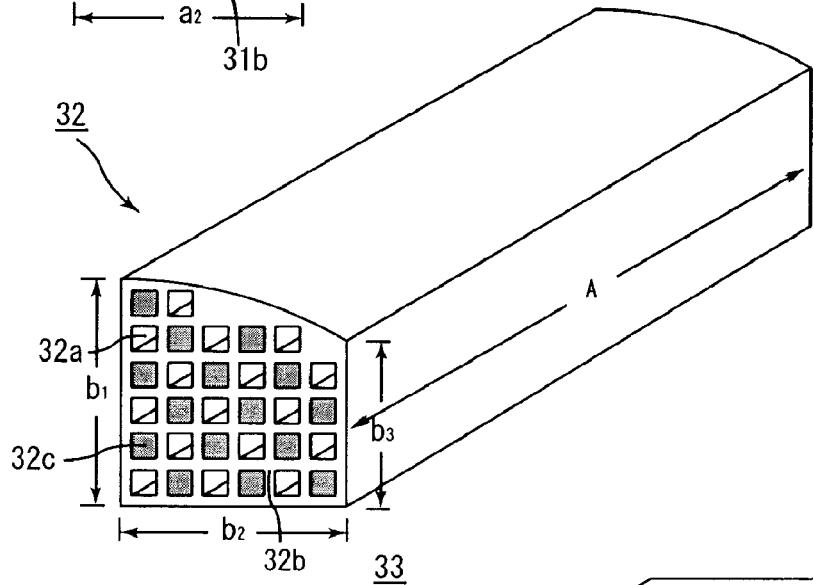
Figure 1C:
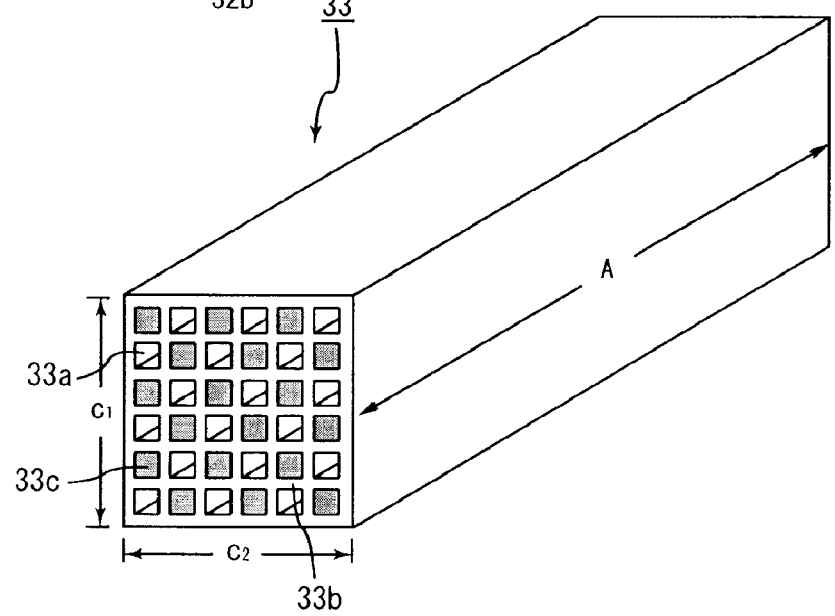

FIGS. 1A to 1C are perspective views schematically showing honeycomb fired bodies used upon bonding various kinds of honeycomb fired bodies together, and a direction in parallel with the cells shown by an arrow A is referred to as a longitudinal direction, a face where the cells are exposed is referred to as an end face, and faces other than the end face are referred to as a side face.

In a honeycomb fired body 31, a large number of cells 31a are disposed in parallel with one another in a longitudinal direction with a cell wall 31b therebetween, either one end of each of the cells 31a is sealed with a plug 31c, and a side face is formed by two plane faces and one curved face.

In a honeycomb fired body 32, a large number of cells 32a are disposed in parallel with one another in a longitudinal direction with a cell wall 32b therebetween, either one end of each of the cells 32a is sealed with a plug 32c, and a side face is formed by three plane faces and one curved face.

In a honeycomb fired body 33, a large number of cells 33a are disposed in parallel with one another in a longitudinal direction with a cell wall 33b therebetween, either one end of each of the cells 33a is sealed with a plug 33c, and a side face is formed by four plane faces.

Figure 4A:
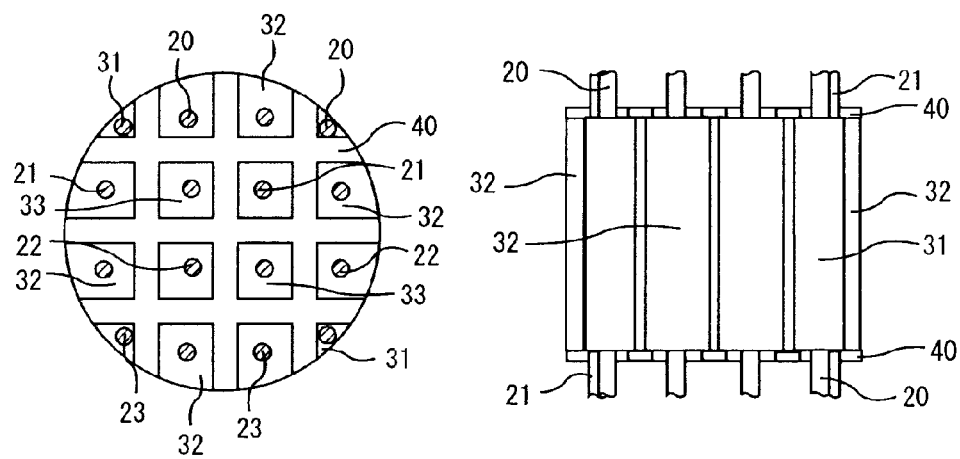
FIGS. 4A to 4C are drawings schematically showing a manufacturing of a honeycomb structure according to a first embodiment.
Figure 4B:
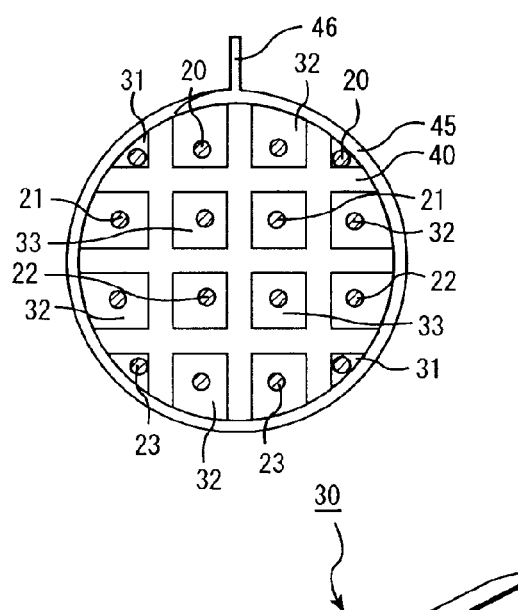
Figure 4C:
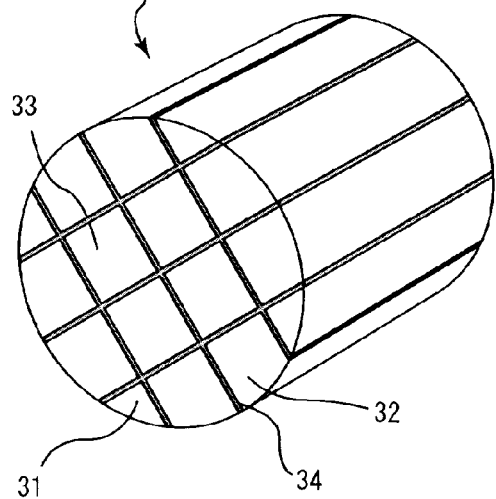

FIGS. 2A to 2D and FIGS. 3A to 3D are vertical cross-sectional views and plan views schematically showing a supporting and injecting upon manufacturing a honeycomb structure according to the first embodiment using the honeycomb fired bodies 31, 32, and 33, and FIGS. 4A to 4C are drawings schematically showing a manufacturing of a honeycomb structure according to the first embodiment. In each drawing, a left view is a vertical cross-sectional view, and a right view is a plan view. Here, each honeycomb fired body is indicated only by an outline.

In the present embodiment, a plurality of the honeycomb fired bodies are placed on each of mounting faces of a plurality of mounting members each having the mounting face in such a manner that the honeycomb fired bodies are disposed in parallel with one another in the longitudinal direction.

Figure 2A:
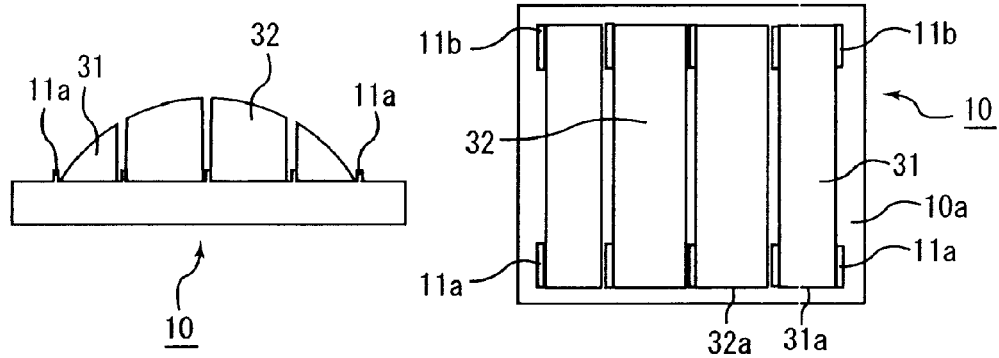
FIGS. 2A to 2D are vertical cross-sectional views and plan views schematically showing a holding and an injecting in a manufacturing of a honeycomb structure according to a first embodiment.

First, as shown in FIG. 2A, two pieces of the honeycomb fired bodies 31 are placed at both right and left ends of a mounting face 10a of a mounting member 10, and on the other hand, two pieces of the honeycomb fired bodies 32 are placed between the two pieces of honeycomb fired bodies 31, and then, the mounting member 10 where these honeycomb fired bodies 31 and 32 have been placed is conveyed into an assembly apparatus which can inject a plug material paste and the mounting member 10 is fixed so that the mounting face 10a is kept horizontal.

Protruding portions 11a and 11b for positioning are disposed at each of four corners of the four pieces of honeycomb fired bodies 31 and 32 placed in such a manner that the honeycomb fired bodies are disposed in parallel with one another in the longitudinal direction. Thus, each of the honeycomb fired bodies 31 and 32 is placed within the predetermined position. That is, each of the honeycomb fired bodies 31 and 32 is placed between the four protruding portions 11a and 11b disposed at the four corners, and the position in a horizontal direction in the drawing is regulated by these protruding portions 11a and 11b. In this case, a total of ten protruding portions 11a and 11b are disposed on the mounting face 10a.

A distance between the protruding portions 11a for positioning and a distance between the protruding portions 11b have a width slightly wider than the width of each of the honeycomb fired bodies 31 and 32, taking a dimensional error into account; consequently the honeycomb fired bodies can slightly shift. However, the protruding portions 11a and 11b for regulating the positions are also disposed at right and left of the four pieces of honeycomb fired bodies 31 and 32; therefore, the honeycomb fired body 31 is not displaced from inside the protruding portions 11a and 11b, and the width of each of the honeycomb fired bodies 31 and 32 tends to be more correctly kept constant in comparison with the case where, for example, honeycomb fired bodies are bonded together by interposing a spacer having a predetermined thickness.

Figure 2B:
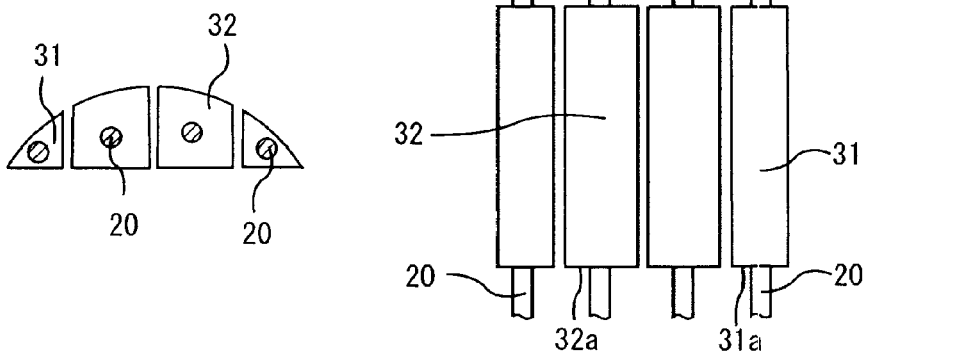

Next, as shown in FIG. 2B, a holding member 20 disposed in the assembly apparatus extends to a direction of both end faces of the honeycomb fired bodies 31 and 32, and then the holding member 20 is made in contact with both end faces of the honeycomb fired bodies 31 and 32; subsequently the honeycomb fired bodies 31 and 32 are firmly sandwiched and held from both end faces.

In this case, the holding member 20 holds the honeycomb fired bodies 31 and 32 in such a manner that the end faces of the honeycomb fired bodies 31 and 32 are in the same plane.

Next, the mounting member 10 is moved to another place. The honeycomb fired bodies 31 and 32 are firmly held with the holding member 20, thereby being fixed on the same position where the honeycomb fired bodies have been placed on the mounting member 10.

Figure 2C:
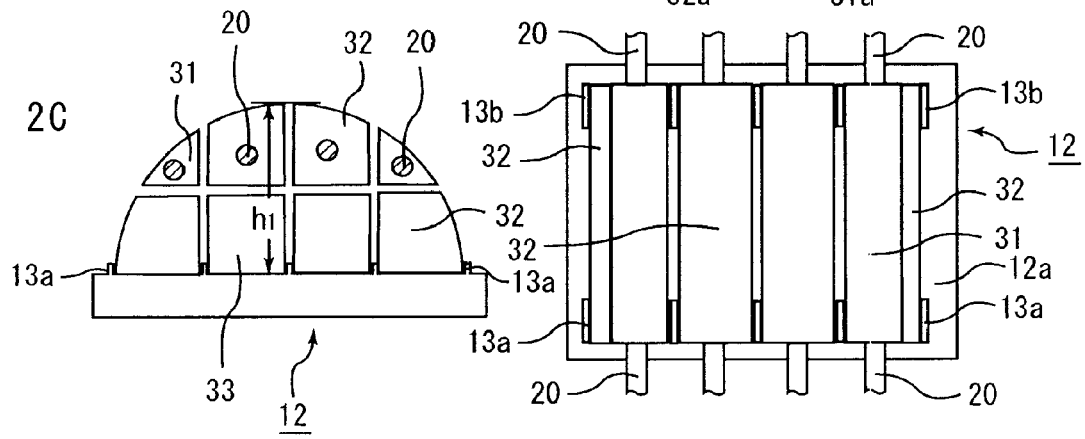

Next, as shown in FIG. 2C, a mounting member 12 in which two pieces of honeycomb fired bodies 32 and two pieces of square pillar-shaped honeycomb fired bodies 33 are placed in parallel with one another between four protruding portions 13a and 13b on a mounting face 12a is moved under the four pieces of honeycomb fired bodies 31 and 32 held with the holding member 20. In this case, a total of 10 protruding portions 13a and 13b are disposed on the mounting face 12a of the mounting member 12. Subsequently, the mounting member 12 is placed in such a manner that a distance h1 in the vertical direction between the uppermost portion of the fixed four pieces of honeycomb fired bodies 31 and 32 in an upper position and the lowermost portion of the four pieces of honeycomb fired bodies 32 and 33 in a lower position is made to be constant; that a bottom face of the four pieces of honeycomb fired bodies 31 and 32 in the upper position and a bottom face of the four pieces of honeycomb fired bodies 32 and 33 in the lower position are made in parallel with one another; and that in the case where the center axis is set in the longitudinal direction, the center axis of entire four pieces of honeycomb fired bodies 31 and 32 in the upper position and the center axis of entire four pieces of honeycomb fired bodies 32 and 33 in the lower position are made to be superposed in the vertical direction. With respect to the distance h1, an average value of the maximum widths in the vertical direction of the honeycomb fired bodies in the upper position is measured, and based on the average value, the position of the mounting member 12 is calculated. The position in the horizontal direction is related to the position of the mounting member in the upper position, so that the position tends to be easily calculated, and it may become easier to place the mounting member 12 at the calculated position by using a robot having a holding part such as an arm, and the like.

Figure 2D:
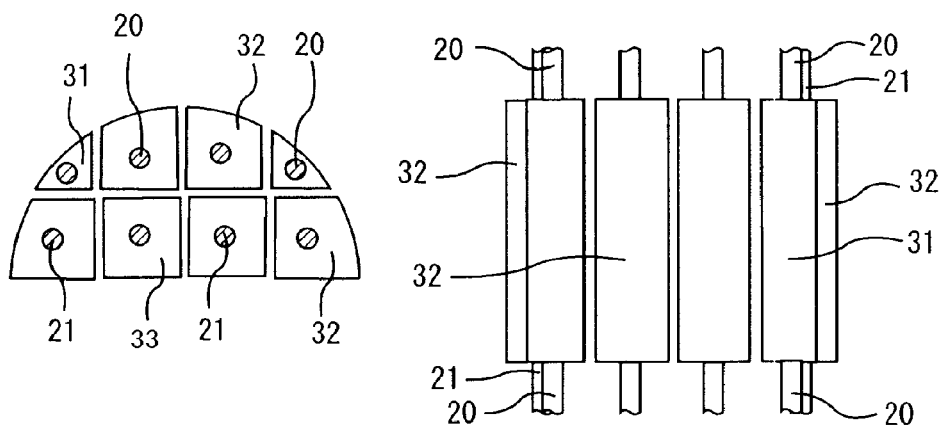

Next, as shown in FIG. 2D, another holding member 21 disposed in the assembly apparatus extends to a direction of both end faces of the honeycomb fired bodies 32 and 33, and then the holding member 21 is made in contact with both end faces of the honeycomb fired bodies 32 and 33; subsequently the honeycomb fired bodies 32 and 33 are firmly sandwiched and held from both end faces.

In this case, the holding member 21 holds the honeycomb fired bodies 32 and 33 in such a manner that the end faces of the eight pieces of honeycomb fired bodies 31, 32, and 33 (hereinafter, referred to as the honeycomb fired bodies 31 to 33) are in the same plane.

Then, the mounting member 12 is moved to another place in the same manner as in the preceding moving. The honeycomb fired bodies are firmly held with the holding member 21, thereby being fixed on the same position where the honeycomb fired bodies have been placed on the mounting member 12.

Next, as shown in FIG. 3A, a mounting member 14 in which two pieces of the honeycomb fired bodies 32 and two pieces of the honeycomb fired bodies 33 are placed in parallel with one another by being sandwiched by four protruding portions 15a and 15b on the mounting face 14a is moved under the eight pieces of honeycomb fired bodies 31 to 33 held with the holding members 20 and 21. In this case, a total of ten protruding portions 15a and 15b are disposed on the mounting face 14a. Subsequently, the mounting member 14 is placed in such a manner that a distance h2 in the vertical direction between the uppermost portion of the fixed eight pieces of honeycomb fired bodies 31 to 33 in an upper position and the lowermost portion of the four pieces of honeycomb fired bodies 32 and 33 in a lower position is made to be constant; that a bottom face of the eight pieces of honeycomb fired bodies 31 to 33 in the upper position and a bottom face of the four pieces of honeycomb fired bodies 32 and 33 in the lower position are made in parallel with one another; and that in the case where the center axis is set in the longitudinal direction, the center axis of entire eight pieces of honeycomb fired bodies 31 to 33 and the center axis of entire four pieces of honeycomb fired bodies 32 and 33 are made to be superposed in the vertical direction.

Next, as shown in FIG. 3B, another holding member 22 disposed in the assembly apparatus extends to a direction of both end faces of the honeycomb fired bodies 32 and 33, and then the holding member 22 is made in contact with both end faces of the honeycomb fired bodies 32 and 33; subsequently the honeycomb fired bodies 32 and 33 are firmly sandwiched and held from both end faces.

In this case, the holding member 22 holds the honeycomb fired bodies 32 and 33 in such a manner that the end faces of the 12 pieces of honeycomb fired bodies 31 to 33 are in the same plane.

Next, as shown in FIG. 3C, a mounting member 16 in which two pieces of the honeycomb fired bodies 31 and two pieces of the honeycomb fired bodies 32 are placed on the predetermined position with six protruding portions 17a and 17b on a mounting face 16a including a curved face is moved under the 12 pieces of honeycomb fired bodies 31 to 33 held with the holding members 20, 21, and 22. Subsequently, the mounting member 16 is placed in such a manner that a distance h3 in the vertical direction between the uppermost portion of the fixed 12 pieces of honeycomb fired bodies 31 to 33 in an upper position and the lowermost portion of the four pieces of honeycomb fired bodies 31 and 32 in a lower position is made to be constant; that a bottom face of the 12 pieces of honeycomb fired bodies 31 to 33 in the upper position and a top face of the four pieces of honeycomb fired bodies 31 and 32 in the lower position are made in parallel with one another; and that in the case where the center axis is set in the longitudinal direction, the center axis of entire 12 pieces of honeycomb fired bodies 31 to 33 in the upper position and the center axis of entire four pieces of honeycomb fired bodies 31 and 32 in the lower position are made to be superposed in the vertical direction.

Here, in this case, the two pieces of honeycomb fired bodies 31 and the two pieces of honeycomb fired bodies 32 are to be a bottom portion of a pillar-shaped honeycomb structure to be manufactured, so that the honeycomb fired bodies are required to be placed with curved portions down. Therefore, as shown in FIG. 3C, a recessed portion having the curved face same as the shape of the bottom portion of the honeycomb fired bodies 31 and 32 is formed on the mounting face 16a, and the honeycomb fired bodies are placed with the curved face down in such a manner that the honeycomb fired bodies fit to the recessed portion 160a.

Next, as shown in FIG. 3D, another holding member 23 disposed in the assembly apparatus extends to a direction of both end faces of the honeycomb fired bodies 31 and 32, and then the holding member 23 is made in contact with both end faces of the honeycomb fired bodies 31 and 32; subsequently the honeycomb fired bodies 31 and 32 are firmly sandwiched and held from both end faces.

In this case, the holding member 23 holds the honeycomb fired bodies 31 and 32 in such a manner that the end faces of the 16 pieces of honeycomb fired bodies 31 to 33 are in the same plane.

Thus, the 16 pieces of honeycomb fired bodies 31 to 33 forming a honeycomb structure 30 tend to be aligned and fixed so as to be made in parallel with one another in the longitudinal direction, with each of end faces at the same side being in the same plane. The 16 pieces of honeycomb fired bodies 31 to 33 thus aligned is referred to as a honeycomb aggregated body 300.

Thereafter, as shown in FIG. 4A, an end-face adhering member 40 having a checkered pattern is closely adhered to the honeycomb aggregated body 300 so as to fill up the gap in both end faces of the honeycomb aggregated body 300, with the adhesive paste not overflowing from both end faces. Then, as shown in FIG. 4B, a soft resin sheet 45 is wound around the entire side face, the portion other than the both end faces, of the honeycomb aggregated body 300, so that the adhesive paste is not overflowed from the side faces. An injecting pipe 46 for injecting the adhesive paste is formed on the sheet 45, and the adhesive paste is injected into the gap portion of the honeycomb fired bodies 31 to 33 forming the honeycomb aggregated body 300 by injecting the adhesive paste from the injecting pipe 46.

Thereafter, by removing the sheet 45 and the end-face adhering member 40 and drying the adhesive paste at a predetermined temperature, a honeycomb structure 30 in which the honeycomb fired bodies 31, 32, and 33 are bonded together by interposing the adhesive layer 34 can be manufactured as shown in FIG. 4C.

In comparison with the conventional case where the honeycomb fired bodies are bonded together by interposing a spacer having a predetermined thickness, since the distance of the honeycomb structure 30 in the horizontal direction is controlled by disposing a protruding portion on the mounting face of the mounting member and the distance in the vertical direction is controlled by controlling the position of the mounting member in the vertical direction, a large dimensional shift, which is caused by deviating to a side where a variation in the dimension of each of the honeycomb fired bodies and a variation in the gap between the honeycomb fired bodies are large or small, tends not to be occurred, and therefore a honeycomb structure with a high dimensional accuracy in the present embodiment tends to be manufactured.

The holding in which the plurality of honeycomb fired bodies are positioned on the predetermined position and then both end faces of the honeycomb fired bodies are sandwiched and held with the holding member is described hereinabove; however, the holding method is not limited to the above-mentioned sandwiching and holding method with the holding member, and any other methods such as a method in which both end faces of the honeycomb fired bodies are hung with the holding member to held, and the like can be used. However, the sandwiching and holding method with the holding member is preferable by taking into account an easiness of holding, a certainty, and an influence of a crack or a damage on a periphery of the honeycomb fired body.

In the honeycomb structure shown in FIG. 4C, either one end portion of a cell is sealed and the honeycomb structure can be used as a honeycomb filter for purifying exhaust gases, and in some cases, a catalyst can be supported thereon.

On the other hand, a honeycomb structure may be a honeycomb structure in which both end portions of a cell is not sealed with a plug, and such a honeycomb structure can be suitably used as a catalyst supporting carrier.

Figure 5A:
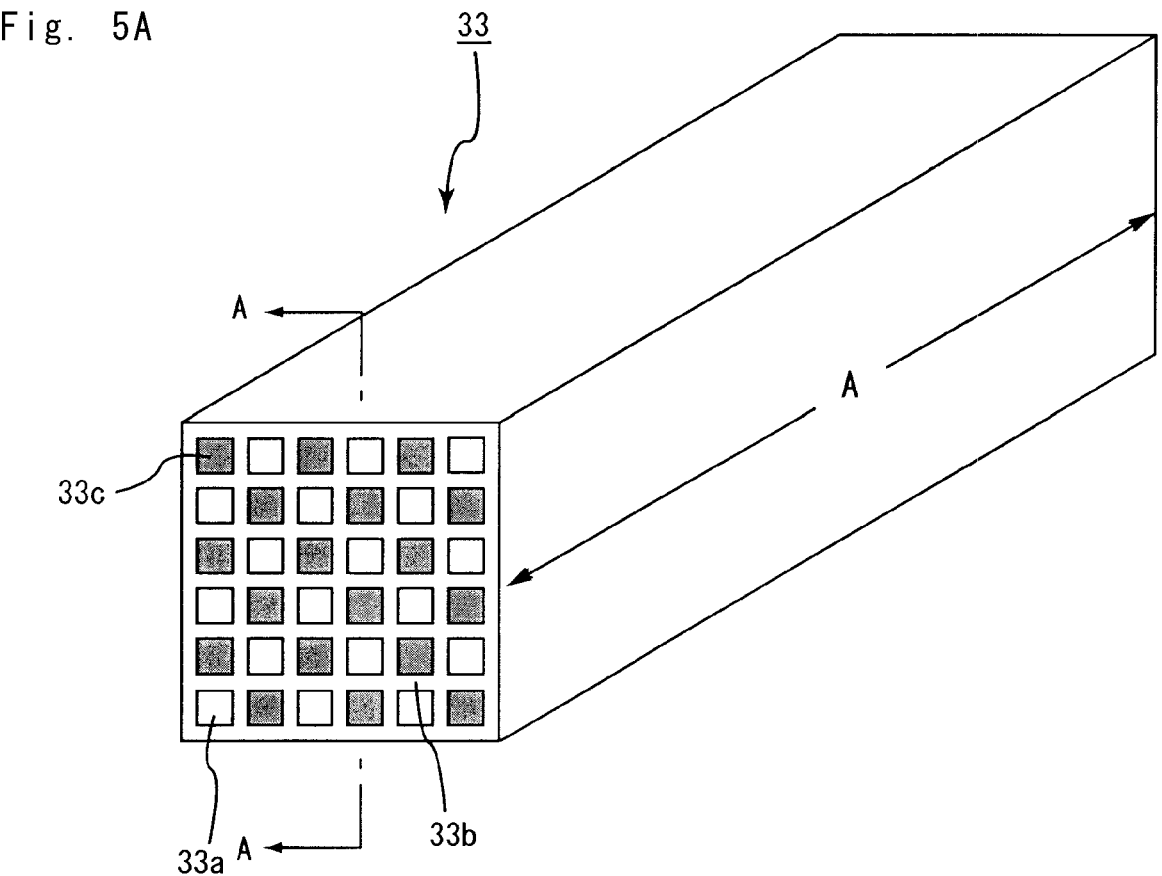
FIG. 5A is a perspective view showing a honeycomb fired body 33 forming a honeycomb structure 30.
Figure 5B:
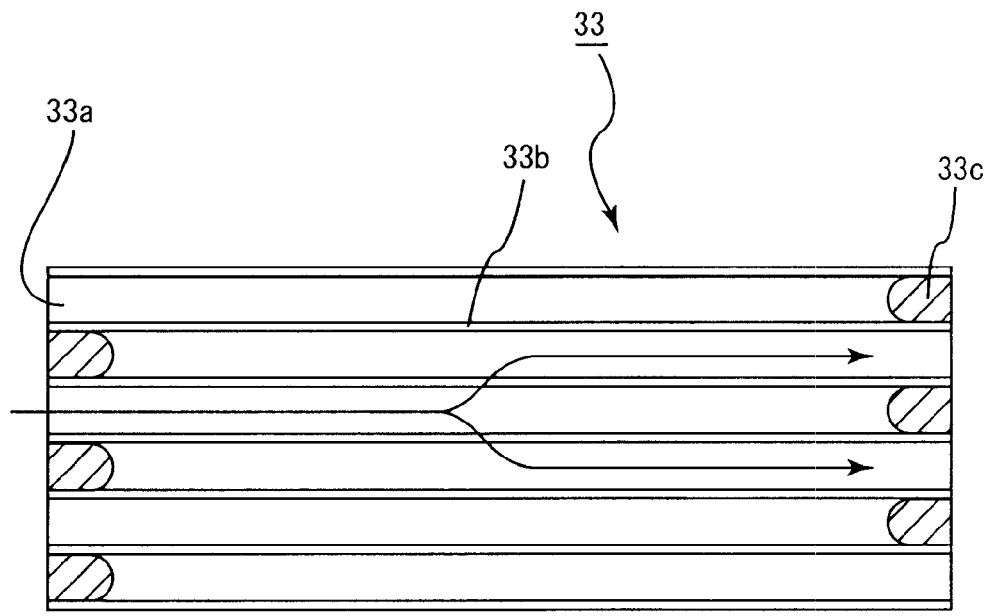
FIG. 5B is an A-A line cross-sectional view of the honeycomb fired body.

FIG. 5A is a perspective view showing the honeycomb fired body forming the honeycomb structure 30, and FIG. 5B is an A-A line cross-sectional view of the honeycomb fired body 33.

In the honeycomb fired body 33, a large number of cells 33a are disposed in parallel with one another in a longitudinal direction (the direction shown by an arrow A in FIG. 5A), and a cell wall 33b partitioning the cells 33a functions as a filter.

That is, as shown in FIG. 5B, either one end of exhaust-gas inlet side or outlet side of each of the cells 33a disposed in the honeycomb fired body 33 is sealed with a plug 33c, and exhaust gases flowing into one cell 33a always pass through the cell wall 33b partitioning the cells 33a and thereafter flow out from another cell 33a. Upon passing through the cell wall 33b, the exhaust gases are purified.

The following description will discuss all processes in the method for manufacturing a honeycomb structure in the present embodiment. Hereinafter, the following description will discuss a method for manufacturing a honeycomb structure in which either one end of the honeycomb structure is sealed with a plug.

First, a powder mixture is prepared by dry-mixing silicon carbide powders having different average particle diameters as ceramic materials and an organic binder and a liquid mixture is also prepared by mixing a liquid plasticizer, a lubricant, and water. Next, the powder mixture and the liquid mixture are mixed by a wet mixing machine to prepare a wet mixture for manufacturing a molded body.

A particle diameter of the silicon carbide powder is not particularly limited, and the silicon carbide powder which tends not to cause the case where the size of the honeycomb structure manufactured by the following firing treatment becomes smaller than that of a degreased honeycomb molded body is preferable. For example, a silicon carbide powder containing 100 parts by weight of a powder having an average particle diameter of at least about 0.3 μm and at most about 50 μm and at least about 5 parts by weight and at most about 65 parts by weight of another powder having an average particle diameter of at least about 0.1 μm and at most about 1.0 μm is preferable.

It is possible to adjust a pore diameter and the like of the honeycomb fired body by adjusting a particle diameter of an inorganic powder.

Next, the wet mixture is charged into an extrusion-molding apparatus.

The wet mixture charged into the extrusion-molding apparatus is extrusion-molded to become a honeycomb molded body having a predetermined shape. This honeycomb molded body is cut and then dried with a drying apparatus to be a dried honeycomb molded body.

Next, the both ends of the dried honeycomb molded body is cut with a cutting apparatus, thereby cutting the honeycomb molded body into a predetermined length. Then, a predetermined amount of a plug material paste that forms a plug is injected into end portions of the gas-outlet side of a group of cells in which an end face of the gas-inlet side is open and also injected into end portions of the gas-inlet side of a group of cells in which an end face of the gas-outlet side is open, so that the cells are sealed. Upon sealing the cells, a method in which a mask for sealing is attached to the end face of the honeycomb molded body (that is, a cut face after cutting) to inject the plug material paste into only the cells required to be sealed can be used.

Thus, a cell-sealed honeycomb molded body is manufactured.

Next, the cell-sealed honeycomb molded body is degreased in a degreasing furnace to heat organic substances in the cell-sealed honeycomb molded body, and then, conveyed to a firing furnace to carry out a firing treatment, thereby manufacturing a honeycomb fired body.

Thereafter, as described above, a honeycomb structure is manufactured by holding both end faces of each of the honeycomb fired bodies with a holding member after positioning a plurality of the honeycomb fired bodies on a predetermined position; injecting an adhesive paste into a gap between the plurality of honeycomb fired bodies held on the predetermined position; and drying and solidifying the adhesive paste to form an adhesive layer.

Here, as the adhesive paste, an adhesive paste containing an inorganic binder, an organic binder, and at least one of inorganic fibers and inorganic particles can be used.

The following description will discuss operations and effects of the method for manufacturing a honeycomb structure according to the present embodiment.

(1) In the method for manufacturing a honeycomb structure according to the first embodiment, in the holding, honeycomb fired bodies are positioned on the predetermined position and both end faces of the honeycomb fired bodies are held with the holding member, and in the injecting, the adhesive paste is injected into the gap between the positioned honeycomb fired bodies, so that a thickness of the adhesive paste is almost the same of the width of the above-mentioned gap.

Therefore, it may become easier to manufacture a honeycomb structure with a high dimensional accuracy. Moreover, since the honeycomb fired bodies are positioned on the predetermined position before injecting, even in the case where a position of a single honeycomb fired body is displaced, positions of the other honeycomb fired bodies are not influenced by the displacement. Therefore, it may become easier to manufacture a honeycomb structure with the whole dimensional accuracy high.

(2) Moreover, in the manufacturing of a honeycomb structure including four pieces of honeycomb fired bodies laterally and four pieces of honeycomb fired bodies longitudinally, that is, a total of 16 pieces of honeycomb fired bodies, the position of the four pieces of the honeycomb fired bodies in lateral tends to be aligned along the mounting face, so that it may become easier to manufacture a honeycomb structure with a high dimensional accuracy.

(3) Moreover, in the case where a round pillar-shaped honeycomb structure is manufactured as in the present embodiment, it may become easier to manufacture a honeycomb structure with a high dimensional accuracy by using a mounting member having a curved face on a mounting face.

EXAMPLES

Hereinafter, examples that disclose the first embodiment of the present invention more specifically are shown, but the present invention is not limited to these examples.

In the following example and comparative example, honeycomb structures were manufactured by the method according to the above-mentioned embodiment and by the conventional method, and dimensions of the manufactured honeycomb structures were measured.

Example 1

(1) 52.8% by weight of a silicon carbide coarse powder having an average particle diameter of 22 μm and 22.6% by weight of a silicon carbide fine powder having an average particle diameter of 0.5 μm were wet-mixed, and further to the obtained powder mixture, 2.1% by weight of an acrylic resin, 4.6% by weight of an organic binder (methyl cellulose), 2.8% by weight of a lubricant (UNILUB, manufactured by NOF Corp.), 1.3% by weight of glycerin, and 13.8% by weight of water were mixed and kneaded to obtain a mixed composition, and then, an extrusion-molding was carried out on the mixed composition to manufacture a raw honeycomb molded body having almost the same shape as that of the honeycomb fired body 31 shown in FIG. 1A, a raw honeycomb molded body having almost the same shape as that of the honeycomb fired body 32 shown in FIG. 1B, and a raw honeycomb molded body having almost the same shape as that of the honeycomb fired body 33 shown in FIG. 1C, with cells not being sealed.

(2) Next, these raw honeycomb molded bodies were cut in such a manner that each length in a longitudinal direction was 150 mm, and then the above-mentioned raw honeycomb molded body was dried with a microwave drying apparatus to become a dried honeycomb molded body; thereafter a paste having the same composition as that of the raw honeycomb molded body was injected into predetermined cells and dried again with the drying apparatus.

(3) The dried honeycomb molded body was degreased at a temperature of 400° C., and then a firing treatment was carried out at a temperature of 2200° C. under a normal-pressure argon atmosphere for three hours to manufacture the honeycomb fired bodies 31, 32, and 33.

A size of the manufactured honeycomb fired body 31 was that each of widths a1 and a2 of side face portions which were plane faces shown in FIG. 1A was 19.9 mm±0.5 mm, a length was 150 mm, the number of cells was 31 pcs/cm$^2$, and a thickness of a cell wall was 0.3 mm.

A size of the manufactured honeycomb fired body 32 was that each of widths b1 and b2 of side face portions which were plane faces shown in FIG. 1B was 35 mm±0.5 mm and width b3 was 20 mm±0.5 mm, a length was 150 mm, the number of cells was 31 pcs/cm$^2$, and a thickness of a cell wall was 0.3 mm.

A size of the manufactured honeycomb fired body 33 was that each width a1 and a2 of a side face portion which was a plane face shown in FIG. 1C was 35 mm±0.5 mm, a length was 150 mm, the number of cells was 31 pcs/cm$^2$, and a thickness of a cell wall was 0.3 mm.

(4) A honeycomb structure was manufactured through the above-mentioned method by using a heat-resistant adhesive paste containing: 30% by weight of alumina fibers having an average fiber length of 20 μm; 21% by weight of silicon carbide particles having an average particle diameter of 0.6 μm; 15% by weight of silica sol; 5.6% by weight of carboxymethyl cellulose; and 28.4% by weight of water.

That is, the honeycomb structure was manufactured through the holding, injecting, and drying, and the holding includes previously placing four pieces of honeycomb fired bodies on the mounting member on which the protruding portions for positioning were disposed so that the honeycomb fired bodies were placed in parallel with one another in the longitudinal direction; holding side faces of each of the honeycomb fired bodies with the holding member after positioning each of the honeycomb fired bodies on a predetermined position by being correctly conveyed to a certain position on the assembly apparatus, the injecting includes injecting the adhesive paste into the gap formed in the aggregated body including the positioned 16 pieces of honeycomb fired bodies, and the drying includes drying the honeycomb fired bodies at a temperature of 120° C. after adhering the 16 pieces of honeycomb fired bodies.

In this case, a diameter of a honeycomb structure having a round pillar-shape was set to 143 mm+1 mm.

Comparative Example 1

The honeycomb fired bodies 31, 32, and 33 were manufactured by carrying out (1), (2), and (3) in the same manner as in Example 1.

(4) Next, spacers made of a cardboard each having a diameter of 5.0 mm and a thickness of 1.0 mm were attached at two points on the side faces of each of the honeycomb fired bodies 31, 32, and 33. Here, the number of the spacers was adjusted in such a manner that the spacer was attached at either one of the side faces adjoining upon assembling the 16 pieces of honeycomb fired bodies 31, 32, and 33 by interposing the adhesive paste.

Then, by using an adhesive paste having the same composition as that of the adhesive paste used in Example 1, an adhesive-paste layer having almost the same thickness as that of the spacer was formed by applying the adhesive paste so that the thickness was almost even, and then, on this adhesive paste layer, repeatedly another honeycomb fired body was piled up and the adhesive-paste layer was formed; thereafter a drying was carried out to manufacture a honeycomb structure.

(Measurement of Peripheral Shapes)

50 honeycomb structures according to Example 1 and 50 honeycomb structures according to Comparative Example 1 were manufactured, and the end faces thereof were photographed.

Then, with respect to an outline of each of the end faces, the shape was analyzed by the least squares method, so that a center of the end face was decided and a difference (r1−r2) between a radius r1 of the circle being contact with the outermost point on the outline and a radius r2 of the circle being contact with the innermost point on the outline was calculated.

As a result, in Example 1, the largest value of (r1−r2) was 0.8 mm, the smallest value of (r1−r2) was 0.2 mm, and an average value of (r1−r2) was 0.4 mm; on the other hand, in Comparative Example 1, the largest value of (r1−r2) was 2.5 mm, the smallest value of (r1−r2) was 0.6 mm, and an average value of (r1−r2) was 1.7 mm. It was found that it was possible to manufacture the honeycomb structure with a less displacement in the example.

A Second Embodiment

In the first embodiment, the mounting members with the protruding portions for positioning disposed were used. However, the mounting members on which groove portions for positioning are formed may be used.

FIGS. 6A to 6D are front views schematically showing mounting members on which groove portions for positioning are formed and honeycomb fired bodies placed on the mounting members.

Figure 6A:
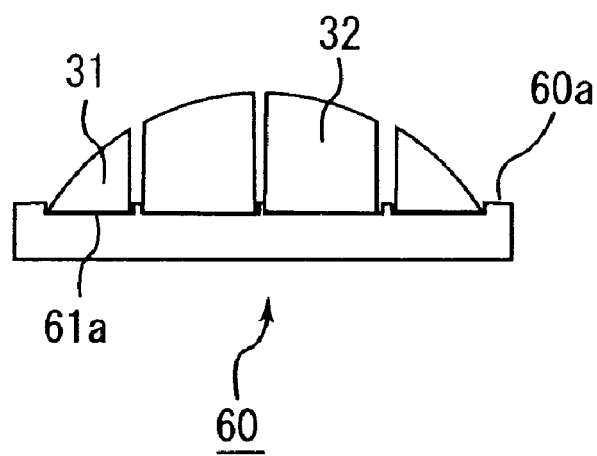
FIGS. 6A to 6D are front views schematically showing a mounting member on which groove portions for positioning are formed and honeycomb fired bodies placed on the mounting member.
Figure 6B:
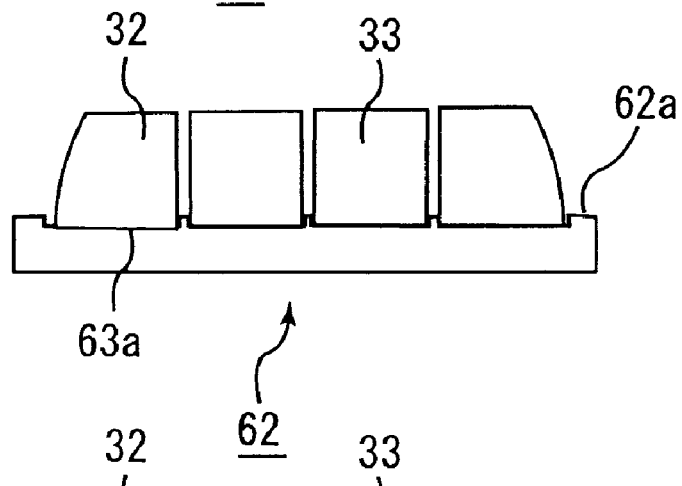
Figure 6C:
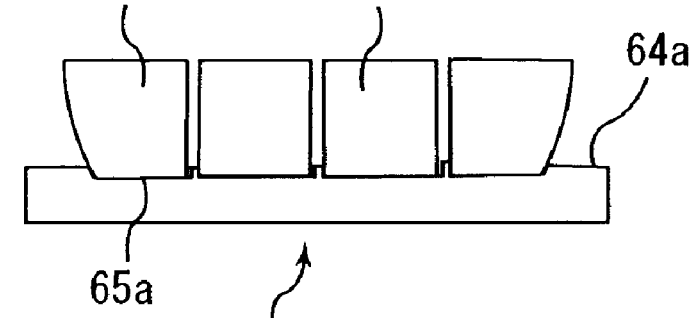

Mounting members 60, 62, 64 on which groove portions 61a, 63a, and 65a are respectively formed on mounting faces 60a, 62a, and 64a are shown in FIGS. 6A to 6C. As plan views are not shown, the bottom portion of each of the honeycomb fired bodies 31 to 33 is respectively placed in the groove portions 61a, 63a, and 65a formed in the longitudinal direction with the same width, and the honeycomb fired bodies 31 to 33 can shift laterally in only a slight width.

Figure 6D:
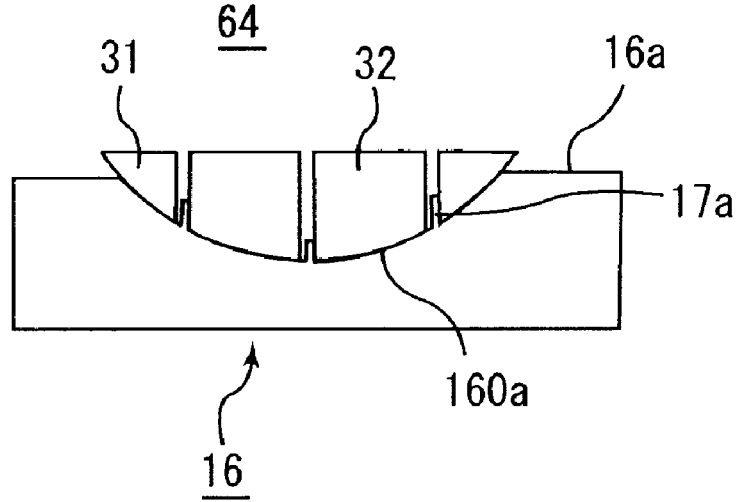

A recessed portion is required to be formed on the mounting member on which the honeycomb fired bodies 31 and 32 corresponding to the bottom portion are placed, and as the recessed portion 160a has already formed on the mounting member 16 shown in FIG. 3C, the mounting member 16 is used in the second embodiment as shown in FIG. 6D. Moreover, groove portions may be formed on the recessed portion 160a by continuously forming protruding portions 17a in the longitudinal direction.

Since the method for manufacturing a honeycomb structure is carried out in the same manner as in the first embodiment except for using the mounting members 60, 62, 64, and 16 shown in FIGS. 6A to 6D as mounting members, the detail description is omitted.

In the method for manufacturing a honeycomb structure according to the second embodiment, the same operations and effects as those of the first embodiment can be enjoyed.

A Third Embodiment

In the first embodiment and the second embodiment, the holding member formed to be capable of holding each of the honeycomb fired bodies by being made in contact with the end faces of the plurality of honeycomb fired bodies were used; however, the holding member may be formed to be capable of collectively holding the plurality of honeycomb fired bodies by being made in contact with the end faces of the plurality of honeycomb fired bodies.

FIGS. 7A to 7D and FIGS. 8A to 8D are vertical cross-sectional views and plan views schematically showing a holding and an injecting in manufacturing of a honeycomb structure according to a third embodiment. Here, each of the honeycomb fired bodies is shown only by an outline.

First, the following description will discuss a holding member used in the present embodiment. As shown in FIGS. 7A to 7D and FIGS. 8A to 8D, each of holding members 70, 72, 74, and 76 is formed by respective contact holding members 70a, 72a, 74a, and 76a, and respective supporting members 71a, 73a, 75a, and 77a which support the contact holding members.

That is, a single holding member 70 includes a single plate-shape contact holding member 70a and four supporting members 71a which support the contact holding member 70a, and the contact holding member 70a collectively firmly sandwiches and holds the four pieces of honeycomb fired bodies placed on the mounting member. The number of the supporting member 71a is not limited to four. Each of the contact holding members 70a, 72a, 74a, and 76a also functions as a end face adhering member 40 which prevents the adhesive paste from overflowing from the end faces (refer to FIG. 4A). As not shown, an air vent is formed on a portion being in contact with the cells of the honeycomb fired body.

Next, the following description will briefly discuss the holding and injecting, referring to FIGS. 7A to 7D and FIGS. 8A to 8D.

Figure 7A:
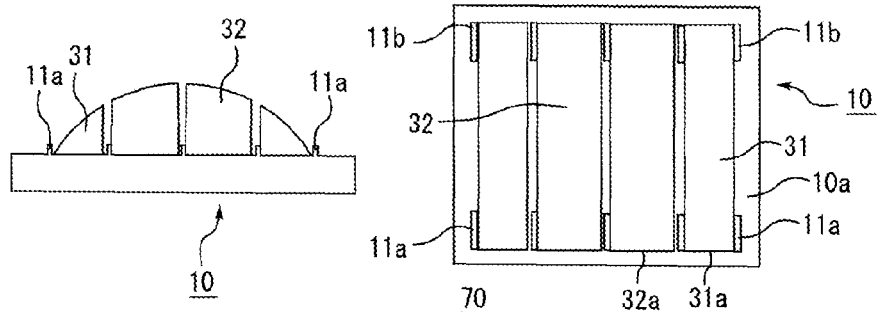
FIGS. 7A to 7D are vertical cross-sectional views and plan views schematically showing a holding and an injecting in a manufacturing of a honeycomb structure according to a third embodiment.

First, in the same manner as in the first embodiment, the four pieces of honeycomb fired bodies 31 and 32 are placed on the mounting face 10a of the mounting member 10, and then conveyed into the assembly apparatus and fixed on a predetermined position so that the mounting face 10a is kept horizontal (refer to FIG. 7A).

Figure 7B:
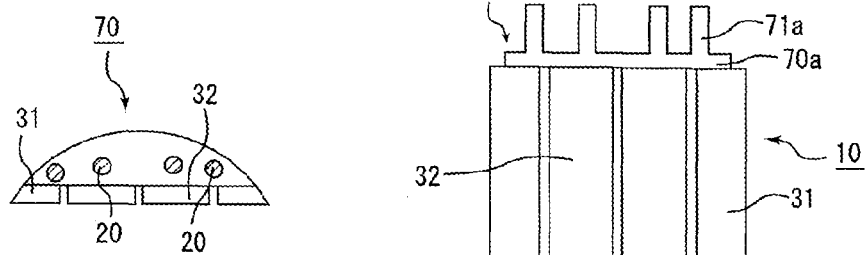

Next, the holding member 70 disposed in the assembly apparatus extends to a direction of both end faces of the honeycomb fired bodies 31 and 32, and then two contact holding members 70a are made in contact with both end faces of the four pieces of honeycomb fired bodies 31 and 32; subsequently firmly sandwich and hold the honeycomb fired bodies (refer to FIG. 7B). A contact face of the contact holding member 70a is a plane face, so that the end faces of the honeycomb fired bodies are in the same plane.

Figure 7C:
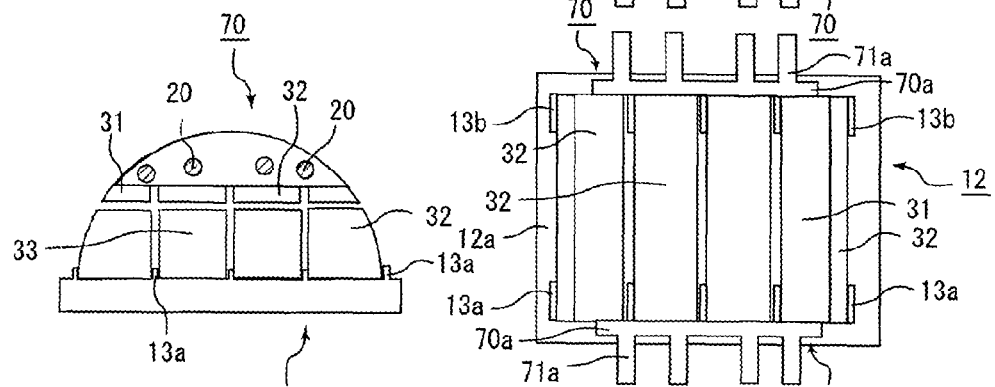

Next, the mounting member 10 is moved to another place, and the mounting member 12 on which the four pieces of honeycomb fired bodies 32 and 33 are placed on the mounting face 12a is moved to a predetermined position under the honeycomb fired bodies 31 and 32 held with the holding member 70 and fixed (refer to FIG. 7C).

Next, another holding member 72 disposed in the assembly apparatus extends to a direction of both end faces of the honeycomb fired bodies 32 and 33, and then the holding member 72 is made in contact with both end faces of the honeycomb fired bodies 32 and 33; subsequently firmly sandwiches and holds the honeycomb fired bodies.

Figure 7D:
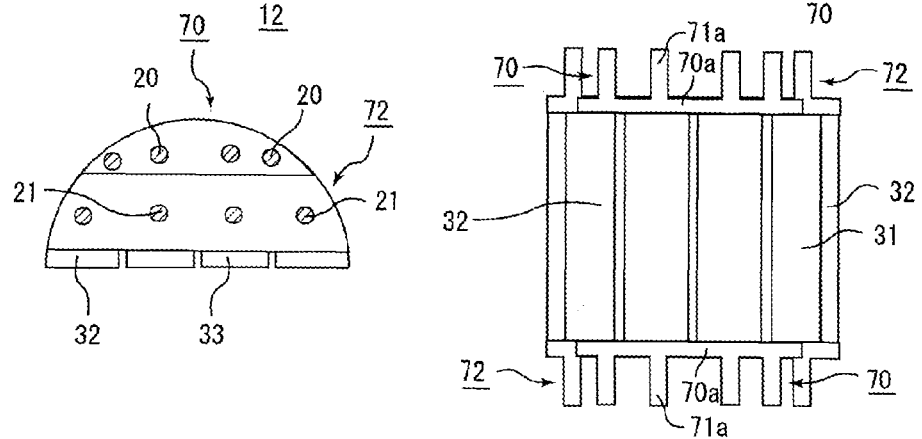

In this case, the holding member 72 holds the honeycomb fired bodies 32 and 33 in such a manner that the end faces of the eight pieces of honeycomb fired bodies 31 to 33 are in the same plane (refer to FIG. 7D).

Figure 8A:
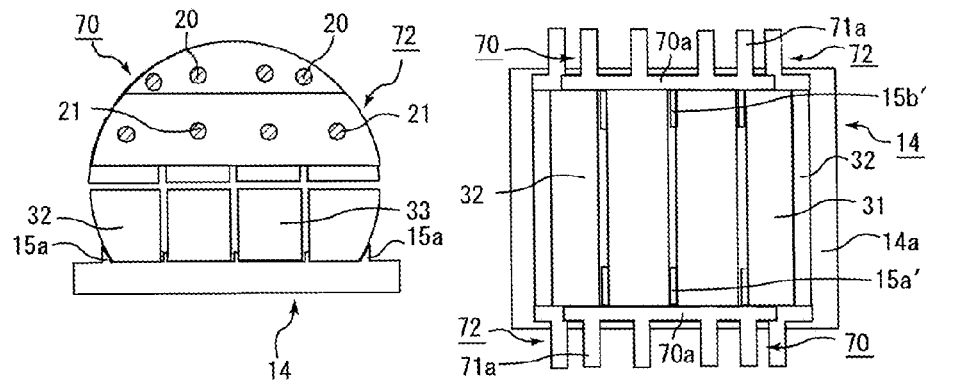
FIGS. 8A to 8D are vertical cross-sectional views and plan views schematically showing a holding and an injecting in a manufacturing of a honeycomb structure according to a third embodiment.

Then, the mounting member 12 is moved to another place in the same manner as the preceding moving, and the mounting member 14 on which the four pieces of honeycomb fired bodies 32 and 33 are placed on the mounting face 14a is moved to a predetermined position under the honeycomb fired bodies 31 to 33 held with the holding member 70 and 72 and fixed (refer to FIG. 8A).

Figure 8B:
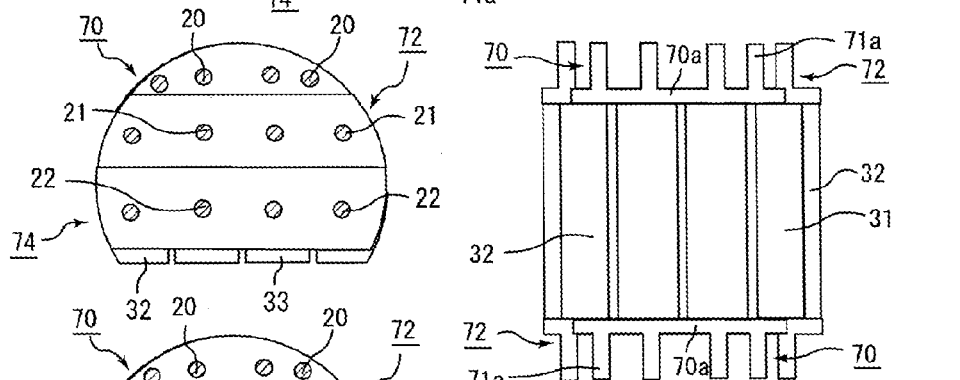

Next, another holding member 74 disposed in the assembly apparatus extends to a direction of both end faces of the honeycomb fired bodies 32 and 33, and then the holding member 74 is made in contact with both end faces of the honeycomb fired bodies 32 and 33; subsequently the honeycomb fired bodies 32 and 33 are firmly sandwiched and held from both end faces (refer to FIG. 8B).

In this case, the holding member 74 holds the honeycomb fired bodies 32 and 33 in such a manner that the end faces of the 12 pieces of honeycomb fired bodies 31 to 33 are in the same plane.

Figure 8C:
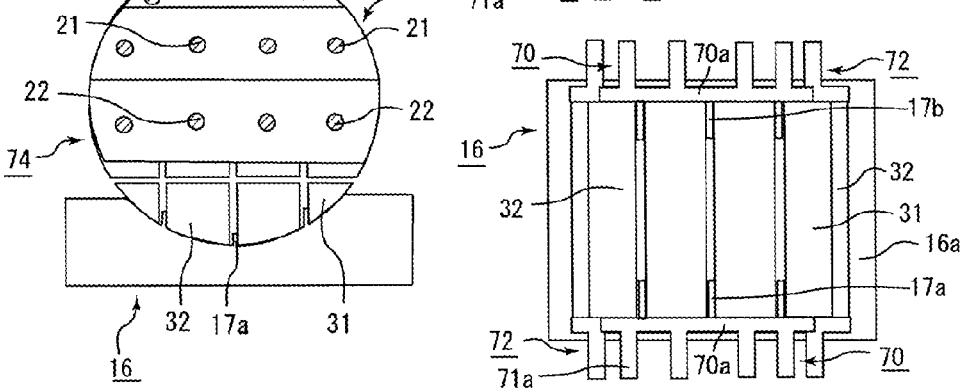

Next, the mounting member 76 on which the four pieces of honeycomb fired bodies 31 and 32 are placed on the recessed portion 160a of the mounting face 16a is moved to a predetermined position under the honeycomb fired bodies 31 to 33 held with the holding member 70, 72, and 74 and fixed (refer to FIG. 8C).

Figure 8D:
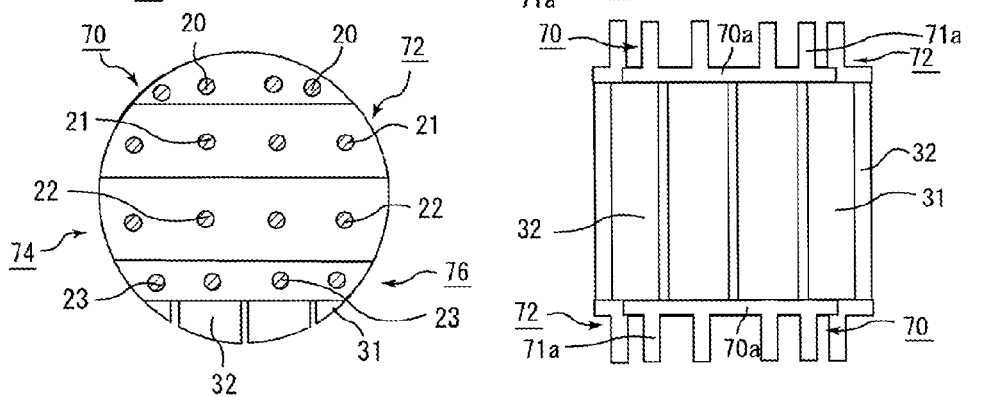

Next, another holding member 76 disposed in the assembly apparatus extends to a direction of both end faces of the honeycomb fired bodies 31 and 32, and then the holding member 76 is made in contact with both end faces of the honeycomb fired bodies 31 and 32; subsequently firmly sandwiches and holds the honeycomb fired bodies (refer to FIG. 8D).

In this case, the holding member 76 holds the honeycomb fired bodies 31 and 32 in such a manner that the end faces of the 16 pieces of honeycomb fired bodies 31 to 33 are in the same plane.

In the present embodiment, since the holding member 76 also functions as the end face adhering member 40 used in the first embodiment (refer to FIG. 4A), a placing of the end face adhering member 40 shown in FIG. 4A can be omitted.

Thereafter, the sheet 45 is wound around the entire side face of the honeycomb aggregated body 300, and the adhesive paste is injected from the injecting pipe 46. Thereafter, the manufacturing of the honeycomb structure 30 is finished through the drying of the adhesive paste.

In the method for manufacturing a honeycomb structure according to the third embodiment, the same operations and effects as those of the first embodiment can be enjoyed.

A Fourth Embodiment

Figure 9:
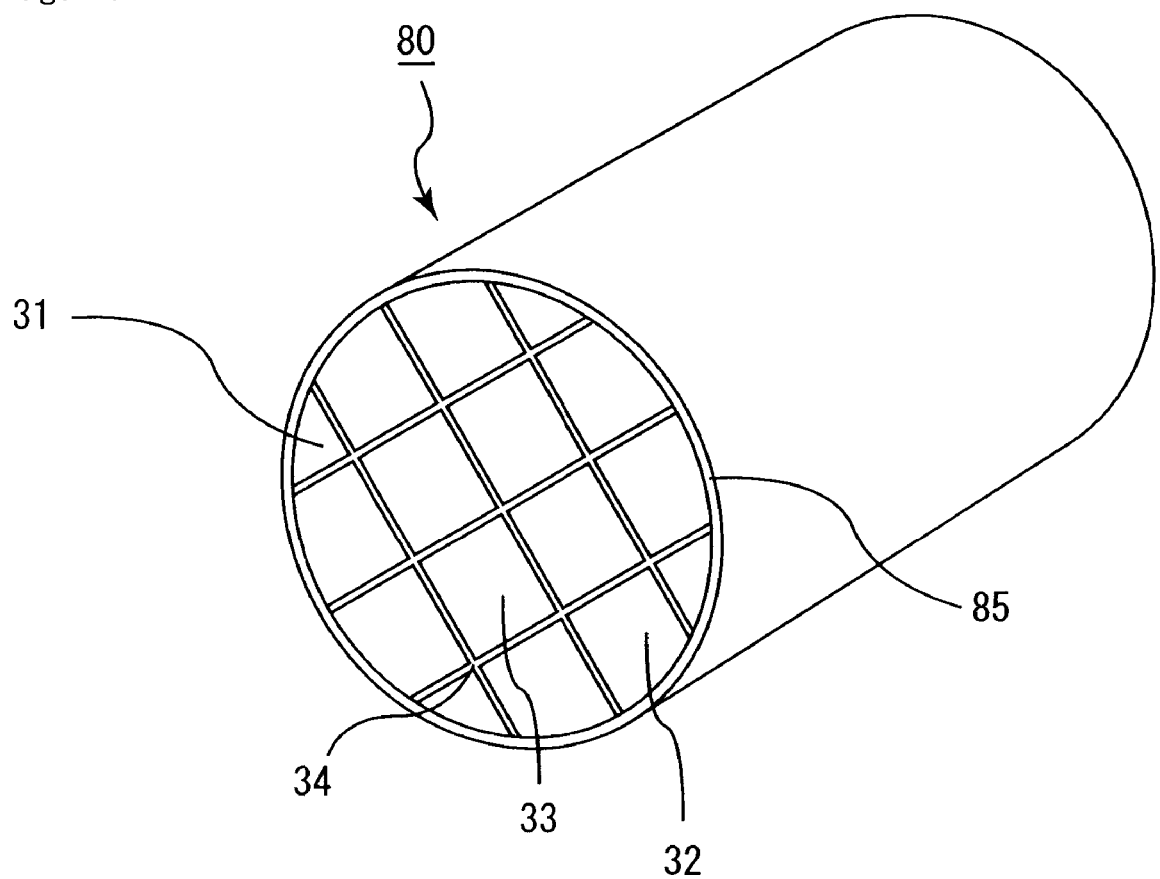
FIG. 9 is a perspective view schematically showing a honeycomb structure in which a sealing material layer is formed on a periphery of honeycomb fired bodies bonded together by interposing an adhesive layer.

In the above-mentioned embodiment, the manufactured honeycomb structure 30 is formed by bonding the honeycomb fired bodies 31 to 33 together through the adhesive layer 34 and no sealing material layer is formed on the periphery; however, a honeycomb structure manufactured by the method according to another embodiment of the present invention may be a honeycomb structure 80 in which a sealing material layer 85 is formed on the periphery of the honeycomb fired bodies 31 to 33 bonded together by interposing the adhesive layer 34 as shown in FIG. 9.

In the method for manufacturing a honeycomb structure according to the fourth embodiment, the same operations and effects as those of the first embodiment can be enjoyed.

Moreover, in the method for manufacturing a honeycomb structure according to the fourth embodiment, since a honeycomb structure with a high dimensional accuracy tends to be manufactured, it may become easier to form a uniform sealing material layer 85 even in the case where the thickness of the sealing material layer is made thin, to keep an aperture ratio of the honeycomb structure high, and to keep a cell density to an area of the entire end face high.

Other Embodiments

The shape of a honeycomb structure manufactured by the method of the embodiments of the present invention is not limited to the round pillar shape shown in FIG. 4C, and the shape may be an optional pillar shape such as cylindroid shape and polygonal pillar shape.

Also, the number of the honeycomb fired bodies forming a honeycomb structure is not limited to 16 pieces as in the above-mentioned embodiment, and the number may be more or less than 16 pieces.

A porosity of a honeycomb structure manufactured by the method according to the embodiment of the present invention is preferably at least about 30% and at most about 70%.

This is because strength of the honeycomb structure tends to be kept and a resistance when exhaust gases pass through the cell wall tends to be kept low.

On the other hand, in the case where the porosity is about 30% or more, the cell wall tends not to be clogged in an early stage, and in the case where the porosity is about 70% or less, the strength of the honeycomb structure tends not to be deteriorated so that the honeycomb structure tends not to be easily broken.

Here, the porosity is measured by the conventionally known methods such as a mercury penetration method, an Archimedes' method, a measuring method with a scanning electron microscope (SEM).

A cell density on a cross section perpendicular to the longitudinal direction of the honeycomb structure is not particularly limited, and a preferable lower limit is about 31.0 pcs/cm$^2$ (about 200 pcs/in$^2$), a preferable upper limit is about 93 pcs/cm$^2$ (about 600 pcs/in$^2$), a more preferable lower limit is about 38.8 pcs/cm$^2$ (about 250 pcs/in$^2$), and a more preferable upper limit is about 77.5 pcs/cm$^2$ (about 500 pcs/in$^2$).

The main component of the constituent materials of the honeycomb structure is not limited to silicon carbide, and examples of other ceramic materials include: nitride ceramics such as aluminum nitride, silicon nitride, boron nitride, titanium nitride; carbide ceramics such as zirconium carbide, titanium carbide, tantalum carbide, tungsten carbide; a composite of metal and nitride ceramics; a composite of metal and carbide ceramics; and the like.

Moreover, the examples of the constituent materials further include ceramic materials such as silicon-containing ceramics formed by mixing metal silicon to the above-mentioned ceramics, and ceramics coupled by silicon or silicate compounds.

The main component of the constituent materials of the honeycomb structure is preferably silicon carbide.

This is because silicon carbide is superior in heat resistance, mechanical strength, thermal conductivity, and the like.

Moreover, compounds formed by mixing metal silicon to silicon carbide (silicon-containing silicon carbide) are also preferable.

An average particle diameter of a silicon carbide powder in the wet mixture is not particularly limited, and a silicon carbide powder which tends not to cause the case where a size of the honeycomb structure manufactured by the following firing treatment becomes smaller than that of a degreased honeycomb molded body is preferable. For example, a silicon carbide powder containing 100 parts by weight of a powder having an average particle diameter of at least about 1.0 μm and at most about 50 μm and at least about 5 parts by weight and at most about 65 parts by weight of a powder having an average particle diameter of at least about 0.1 μm and at most about 1.0 μm is preferable.

An organic binder used upon preparing the wet mixture is not particularly limited, and examples thereof include carboxymethyl cellulose, hydroxyethyl cellulose, polyethylene glycol, and the like. Methyl cellulose is preferable among these. Normally, a blending amount of the organic binder is preferably at least about 1 parts by weight and at most about 10 parts by weight to 100 parts by weight of a ceramic powder.

A plasticizer and a lubricant used upon preparing the wet mixture is not particularly limited, and examples of the plasticizer include glycerin, and the like. Also, examples of the lubricant include polyoxyalkylene-based compounds such as polyoxyethylene alkyl ether and polyoxypropylene alkyl ether, and the like.

The specific examples of the lubricant include polyoxyethylene monobutyl ether, polyoxypropylene monobutyl ether, and the like.

Here, a plasticizer and a lubricant may not be contained in the wet mixture in some cases.

Also, a dispersant solution may be used upon preparing the wet mixture, and examples thereof include water, an organic solvent such as benzene, alcohol such as methanol, and the like.

Moreover, a forming auxiliary may be added to the wet mixture.

The forming auxiliary is not particularly limited, and examples thereof include ethylene glycol, dextrin, fatty acid, fatty acid soap, polyalcohol, and the like.

Furthermore, a pore-forming agent such as balloons that are fine hollow spheres including oxide-based ceramics, spherical acrylic particles, and graphite may be added to the wet mixture as needed.

The balloons are not particularly limited, and examples thereof include alumina balloons, glass micro balloons, shirasu balloons, fly ash balloons (FA balloons), mullite balloons, and the like. Alumina balloons are preferable among these.

Moreover, a content of organic components in the wet mixture is preferably about 10% by weight or less, and a content of water is preferably at least about 8% by weight and at most about 30% by weight.

A plug material paste for sealing the cells is not particularly limited, and a plug material paste that makes a porosity of plugs manufactured through the following processes at least about 30% and at most about 75% is preferable. For example, a plug material paste that has the same composition as the wet mixture can be used.

Examples of an inorganic binder in the adhesive paste include silica sol, alumina sol, and the like.

Each of these may be used alone, or two or more kinds of these may be used in combination. Silica sol is preferable among these inorganic binders.

Examples of an organic binder in the adhesive paste include polyvinyl alcohol, methyl cellulose, ethyl cellulose, carboxymethyl cellulose, and the like. Each of these may be used alone, or two or more kinds of these may be used in combination. Carboxymethyl cellulose is preferable among these organic binders.

Examples of inorganic fibers in the adhesive paste include ceramic fibers such as silica-alumina, mullite, alumina, silica. Each of these may be used alone, or two or more kinds of these may be used in combination. Alumina fibers are preferable among these inorganic fibers.

Examples of inorganic particles in the adhesive paste include carbides, nitrides, and the like. More specifically, the examples thereof include an inorganic powder including a substance such as silicon carbide, silicon nitride, and boron nitride, and the like. Each of these may be used alone, or two or more kinds of these may be used in combination. Silicon carbide is preferable among these inorganic particles due to its superior thermal conductivity.

Furthermore, a pore-forming agent such as balloons that are fine hollow spheres including oxide-based ceramics, spherical acrylic particles, and graphite may be added to the adhesive paste as needed. The balloons are not particularly limited, and examples thereof include alumina balloons, glass micro balloons, shirasu balloons, fly ash balloons (FA balloons), mullite balloons, and the like. Alumina balloons are preferable among these.

A catalyst may be supported on the honeycomb structure, and it is preferable that a catalyst supporting layer is formed in the cells of the honeycomb structure and that the catalyst is supported on the surface of the catalyst supporting layer.

As a material which forms the catalyst supporting layer, a material, allowing the catalyst to be highly dispersed and supported and having a large specific surface area, is preferable. For example, oxide ceramics such as alumina, titania, zirconia, silica, and the like can be used.

Each of these may be used alone, or two or more kinds of these may be used in combination.

A material having a large specific surface area of about 250 $m^2/g$ or more is preferable, and $\gamma$-alumina is more preferable.

A method for forming the catalyst supporting layer including the alumina is not particularly limited, and a method including: impregnating a honeycomb structure with a metal compound solution containing aluminum such as a water solution of aluminum nitrate; forming an alumina film on a cell wall by a sol-gel method; drying and firing the honeycomb structure can be used.

Examples of a catalyst supported on a surface of the catalyst supporting layer include noble metals such as platinum, palladium, rhodium, and platinum is preferable among these. Also, alkali metals such as potassium, sodium, and alkaline-earth metals such as barium, can be used as other catalysts. Each of these catalysts may be used alone, or two or more kinds of these may be used in combination.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for manufacturing a honeycomb structure, said method comprising:
    manufacturing a pillar-shaped honeycomb molded body having a large number of cells disposed in parallel with one another in a longitudinal direction with a cell wall therebetween by extrusion-molding a raw material composition including a ceramic powder and a binder;
    carrying out a firing treatment on said honeycomb molded body to manufacture a honeycomb fired body;
    providing a plurality of said honeycomb fired bodies;
    holding both end faces of each of the plurality of said honeycomb fired bodies with a holding member after positioning the plurality of said honeycomb fired bodies on a predetermined position;
    injecting an adhesive paste into a gap between the plurality of said honeycomb fired bodies held on the predetermined position; and
    drying and solidifying said adhesive paste to form an adhesive layer,
    wherein said holding comprises:
    placing said plurality of honeycomb fired bodies on each mounting face of a plurality of mounting members each having the mounting face so that the honeycomb fired bodies are placed in parallel with one another in said longitudinal direction;
    holding both end faces of each of the honeycomb fired bodies with the holding member after positioning each of the honeycomb fired bodies on the mounting face of a single mounting member on the predetermined position, and subsequently moving said single mounting member to another place;
    holding both end faces of each of the honeycomb fired bodies with a holding member after positioning each of the honeycomb fired bodies on a mounting face of an other mounting member on the predetermined position directly under said held honeycomb fired body; and
    thereafter, repeatedly moving the mounting member after holding the honeycomb fired body to an other place and repeatedly holding the honeycomb fired body on a mounting face of an other mounting member, to position and hold a required number of the honeycomb fired bodies on the predetermined position.

2. The method for manufacturing a honeycomb structure according to claim 1,
    wherein the plurality of mounting members comprise first to fourth mounting members, and in said holding, four pieces of said honeycomb fired bodies are placed on the mounting face of each of the first to fourth mounting members.

3. The method for manufacturing a honeycomb structure according to claim 2,
    wherein
    in said holding, the mounting face of each of said first to third mounting members is a plane face, and a plane face among side faces of said honeycomb fired body is placed on the mounting face of each of said first to third mounting members, and the mounting face of said fourth mounting member is a curved face, and a curved face among the side faces of said honeycomb fired body is placed on the mounting face of said fourth mounting member.

4. The method for manufacturing a honeycomb structure according to claim 1, wherein a protruding portion for positioning is disposed on said mounting face.

5. The method for manufacturing a honeycomb structure according to claim 1, wherein a groove portion for positioning is formed on said mounting face.

\* \* \* \* \*